United States Patent
Bhattacharya et al.

(10) Patent No.: US 9,529,428 B1
(45) Date of Patent: Dec. 27, 2016

(54) USING HEAD MOVEMENT TO ADJUST FOCUS ON CONTENT OF A DISPLAY

(71) Applicant: Amazon Technologies, Inc., Reno, NV (US)

(72) Inventors: Arindam Bhattacharya, Fremont, CA (US); Ben Zion Gabay, Palo Alto, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 113 days.

(21) Appl. No.: 14/229,546

(22) Filed: Mar. 28, 2014

(51) Int. Cl.
*G06F 3/01* (2006.01)
*G06F 3/03* (2006.01)
*H04N 5/232* (2006.01)
*H04N 13/04* (2006.01)

(52) U.S. Cl.
CPC .............. *G06F 3/012* (2013.01); *G06F 3/013* (2013.01); *G06F 3/0304* (2013.01); *H04N 5/232* (2013.01); *H04N 13/0484* (2013.01)

(58) Field of Classification Search
CPC ........ G06F 3/017; G06F 3/048; G06F 3/0481; G06F 3/04812; G06F 3/005; G06F 3/011; G06F 3/012; G06F 3/013; G06F 3/0304; H04N 5/232; H04N 5/23293; H04N 5/23296; H04N 13/0481; H04N 13/0484
See application file for complete search history.

(56) References Cited

U.S. PATENT DOCUMENTS

| | | | | |
|---|---|---|---|---|
| 6,775,835 B1* | 8/2004 | Ahmad | ............... | G06F 9/44526 715/700 |
| 8,879,155 B1* | 11/2014 | Teller | ................. | G06K 9/00604 359/13 |
| 8,885,882 B1* | 11/2014 | Yin | ............................ | G06F 3/00 382/103 |
| 2004/0174496 A1* | 9/2004 | Ji | ............................. | G06F 3/013 351/209 |
| 2008/0320082 A1* | 12/2008 | Kuhlke | ............... | H04L 12/1822 709/205 |
| 2009/0304232 A1* | 12/2009 | Tsukizawa | ............. | A61B 3/113 382/103 |
| 2010/0205667 A1* | 8/2010 | Anderson | ............... | G06F 3/013 726/19 |

(Continued)

OTHER PUBLICATIONS

"Lecture 8 The Kalman Filter", Stanford University EE363 lecture 8, p. 8-1, Winter 2008-2009, web page saved Mar. 9, 2009, http://stanford.edu/class/ee363/lectures/kf.pdf.*

*Primary Examiner* — Larry Sternbane
*Assistant Examiner* — Darlene M Ritchie
(74) *Attorney, Agent, or Firm* — Seyfarth Shaw LLP; Ilan N. Barzilay; Chris A. Baxter

(57) ABSTRACT

Various embodiments provide methods and systems for presenting content to users on a computing device. In some embodiments, the computing device is configured to determine content or object of interest on the display screen of the computing device by using head position information of the user. For example, the content or object of interest can be extrapolated and determined from a 3D head position of the user and the relative position of the computing device. Depending on the content or object of interest, one or more actions (e.g., zooming in or out, rendering advertisement, or auto-focusing) related to the content or object of interest can be performed on the computing device.

22 Claims, 9 Drawing Sheets

(56) References Cited

U.S. PATENT DOCUMENTS

| | | | | |
|---|---|---|---|---|
| 2011/0273466 A1* | 11/2011 | Imai | ................... | G09G 3/20 |
| | | | | 345/589 |
| 2012/0075166 A1* | 3/2012 | Marti | ................... | G06F 3/011 |
| | | | | 345/1.1 |
| 2012/0169887 A1* | 7/2012 | Zhu | ................... | G06T 7/0046 |
| | | | | 348/207.1 |
| 2012/0290950 A1* | 11/2012 | Rapaport | ................... | H04L 51/32 |
| | | | | 715/753 |
| 2012/0306924 A1* | 12/2012 | Willoughby | ................... | A63F 13/10 |
| | | | | 345/641 |
| 2013/0091462 A1* | 4/2013 | Gray | ................... | G06F 3/0346 |
| | | | | 715/810 |
| 2013/0307764 A1* | 11/2013 | Denker | ................... | G06F 3/013 |
| | | | | 345/156 |
| 2014/0055337 A1* | 2/2014 | Karlsson | ................... | G06F 3/013 |
| | | | | 345/156 |
| 2014/0092006 A1* | 4/2014 | Boelter | ................... | G06F 3/013 |
| | | | | 345/156 |
| 2014/0092139 A1* | 4/2014 | Sullivan | ................... | G09G 5/00 |
| | | | | 345/649 |
| 2014/0164056 A1* | 6/2014 | Johnson | ................... | G06Q 30/0201 |
| | | | | 705/7.29 |
| 2014/0168056 A1* | 6/2014 | Swaminathan | ................... | G06K 9/00604 |
| | | | | 345/156 |
| 2014/0267771 A1* | 9/2014 | Lawler | ................... | G06K 9/00597 |
| | | | | 348/169 |
| 2014/0306882 A1* | 10/2014 | Johansen | ................... | G06F 3/013 |
| | | | | 345/156 |
| 2014/0375752 A1* | 12/2014 | Shoemake | ................... | G06F 3/011 |
| | | | | 348/14.07 |
| 2015/0124086 A1* | 5/2015 | Melle | ................... | G01B 11/002 |
| | | | | 348/136 |
| 2015/0156803 A1* | 6/2015 | Ballard | ................... | G02B 27/017 |
| | | | | 455/422.1 |
| 2015/0192990 A1* | 7/2015 | Qiang | ................... | G06F 3/012 |
| | | | | 345/156 |
| 2015/0212702 A1* | 7/2015 | Kim | ................... | G06F 3/04842 |
| | | | | 715/838 |
| 2015/0241967 A1* | 8/2015 | Saripalle | ................... | G06F 3/013 |
| | | | | 382/195 |
| 2016/0109945 A1* | 4/2016 | Kempinski | ................... | G06F 3/013 |
| | | | | 348/78 |

* cited by examiner

USING HEAD MOVEMENT TO ADJUST FOCUS ON CONTENT OF A DISPLAY

BACKGROUND

Portable computing devices are increasingly powerful and affordable. Users are relying upon portable computing devices to handle various types of tasks. For example, portable computing devices are commonly used by many users to play games, send and receive messages, chat with friends, and/or take photos and videos. However, for portable computing devices such as tablet computers or smart phones, the screen size is often limited such that it can be difficult for users to provide input, such as to maneuver content displayed on the screen due to the size of content elements with respect to the size of a user's finger. For example, a user attempting to cause the device to capture an image might have to select a representation of an object on the display screen in order to indicate the correct object on which the camera should focus. Even such a relatively simple action by the user may require a user to go back and forth and attempt a few times in order to indicate the correct object. Such experience can be frustrating to the user, or can at least impact the user experience.

BRIEF DESCRIPTION OF THE DRAWINGS

Various embodiments in accordance with the present disclosure will be described with reference to the drawings, in which.

DETAILED DESCRIPTION

Figure 1:
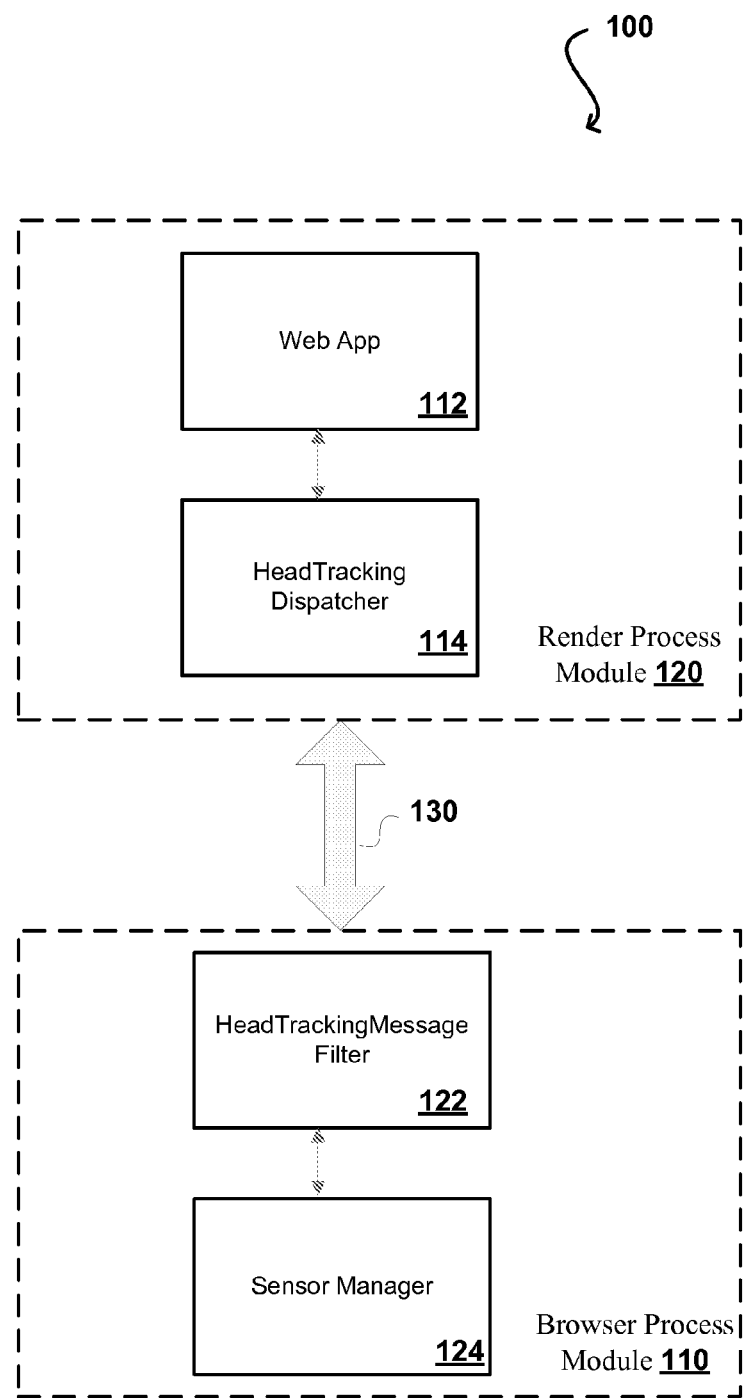
FIG. 1 illustrates an example system for supporting head tracking applications and/or utilizing head tracking information in accordance with various embodiments.

Systems and methods in accordance with various embodiments of the present disclosure overcome deficiencies in conventional approaches for determining input from, or presenting content to, a user of a computing device. More specifically, various embodiments determine head position information with respect to an electronic device and utilize this information to determine an object of interest, for example. Once the object of interest is determined, one or more actions related to the object can be performed. In some embodiments, relative head position information with respect to an electronic device can be extrapolated to various types of information to provide a variety of services to a user of the electronic device. For example, head position information can be used by a web application to determine the content of interest on the display screen of the electronic device. Depending on the content that the user is interested, one or more actions (e.g., zooming in or out, rendering advertisement) related to the content can be performed on the electronic device. In some embodiments, the content or object of interest on the display screen can be determined based at least in part upon one of a display screen position at which the head position is directed or duration that the head position is directed to the display screen position. In some instances, as head position directs from one display screen position to another, the corresponding object of interest on the display screen of the user device can be automatically focused.

At least some embodiments enable a user to use head position as a controller (e.g., a mouse) to maneuver content displayed on user devices. For example, moving head position up and down may cause the mouse arrow to move up and down on the display screen of the user device. When the mouse arrow is placed on a document, folder, or application, nodding head position twice in rapid succession may cause the document, folder or application to be opened.

In some embodiments, relative head position may be used to control media playback. For example, if the user's head position turns away from the display screen or is not detected over a pre-determined period of time, a media file may be automatically paused. In some instances, relative head position can be used to automatically adjust the orientation of the content being displayed on the display screen.

In some embodiments, a bi-direction data pipeline can be established between a web application and a sensor module (e.g., Sensor Manager). The web application is any application software that runs in a web browser or in a browser-supported programming language, such as one of JavaScript, HTML, or CSS, and may rely on a common web browser to render an application. The web application can be configured to run in an operating system that is independent from that of the sensor module. The sensor module can be configured to collect sensor information, such as head tracking events, eye tracking events, gaze tracking events, or emotion tracking events, among others. In some embodiments, upon receiving a request for sensor events from a registered web application, the sensor module can determine whether a pre-determined set of conditions are met (e.g., whether the request events are supported events) and, if the pre-determined set of conditions are met, send the sensor events to the web application via the bi-direction data pipeline. In some instances, the bi-direction data pipeline includes a filter to selectively pass the requested sensor events (e.g., head tracking events) to the web application and/or intercept requests and messages from the web application.

Various other functions and advantages are described and suggested below as may be provided in accordance with the various embodiments.

FIG. 1 illustrates an example system 100 for supporting head tracking applications and/or utilizing head tracking information in accordance with various embodiments. In this example, the system 100 includes a Browser Process Module 110 and a Render Process Module 120, which can be executed independently in the same or different operating systems. The operating systems may include, but are not limited to, Android, Berkeley Software Distribution (BSD), iPhone OS (iOS), Linus, OS X, Unix-like Real-time Operating System (e.g., QNX), Microsoft Windows, Window Phone, and IBM z/OS. Events that are collected or processed at the Browser Process Module 110 can be transmitted to the Render Process Module 120 via Inter-Process Communication (IPC) 130. Messages and/or requests from the Render Process Module 120 can also be communicated to the Browser Process Module 110 through the IPC 130. The Browser Process Module 110, the Render Process Module 120, and the IPC 130 can be configured to establish a bi-direction data pipeline for transmitting events (e.g., head tracking events) and messages associated with sensor events. The protocol of the IPC 130 can be TCP/IP, or any inter-process communication protocol, such as pipes or file-based transfer that are used in place of TCP/IP. In at least some embodiments, the processes on the Browser Process Module 110 have more security privileges than those on the Render Process Module 120.

In some embodiments, the Browser Process Module 110 includes a plurality of sub-modules, such as a Sensor Manager 124. The Sensor Manager 124 may be configured to collect sensor data from one or more sensors on a client device. Although the client device is not shown in FIG. 1, it should be understood that various types of electronic or computing device that capable of sensing images in accordance with various embodiments discussed herein. These client devices can include, for example desktop PCs, laptop computers, tablet computers, personal data assistants (PDAs), smart phones, portable media file players, e-book readers, portable computers, head-mounted displays, interactive kiosks, mobile phones, net books, single-board computers (SBCs), embedded computer systems, wearable computers (e.g., watches or glasses), gaming consoles, home-theater PCs (HTPCs), TVs, DVD players, digital cable boxes, digital video recorders (DVRs), computer systems capable of running a web-browser, or a combination of any two or more of these.

The Sensor Manager 124 can be configured to detect sensor events (e.g., Head Tracking events) and transmit the sensor events to other sub-modules in the Browser Process Module 110 or directly to the IPC 130. In some instances, Head Tracking events can be generated and transmitted at a fixed rate (e.g., 30 events per second) without noticeable latency. In some embodiments, the plurality of sub-modules in the Browser Process Module 110 includes a Head Tracking Message Filter 122. The HeadTrackingMessage Filter 122 is configured to selectively pass Head Tracking events from the Sensor Manager 124 to the IPC 130 or intercept requests from the IPC 130. One of ordinary skill in the art would appreciate that various other type of event filters (e.g., EyeTracking filters, GazeTracking filters, and Emotion-Tracking filters) may be placed independently or combined with the HeadTrackingMessage Filter 122 in the Browser Process Module 110 to selectively pass desired events to the IPC 130 in accordance with various embodiments of the present disclosure.

The Render Process Module 120 includes one or more Web Applications 112 (e.g., a Head Tracking application), which are configured to provide various types of Web services to users. In some embodiments, the one or more Web Applications 112 must be pre-registered with the Sensor Manager 124. The one or more Web Applications 112 can provide various types of services to the users as long as the events requested by the services are supported by the Sensor Manager 124. For example, when a user enables a Web Application 112 on a client device, the Web Application 112 sends a request to the Sensor Manager 124 via the IPC 130. Upon receiving the request from the IPC 130 or other sub-modules in the Browser Process Module 110 (e.g., the HeadTrackingMessage Filter 122), the Browser Process Module 110 can determine whether a pre-determined set of conditions are met (e.g., whether the requested events are supported events, whether the face of the user is detected, and whether the Web Application 112 is a registered application). If the pre-determined set of conditions are met, the Sensor Manager 124 can start to detect or collect the supported sensor events (e.g., Head Tracking events with 3D head position having x, y, and z axis data and a time stamp) and transmit the detected sensor event to the Web Application 112 via the IPC 130 and/or a sensor filter (e.g., the HeadTrackingMessage Filter 122). In some embodiments, the Head Tracking event can be transmitted at a predetermined fixed rate or a rate specified by a Head Tracking Application without noticeable latency. In some embodiments, the Head Tracking Application may be configured to send a Head Tracking request and receive the Head Tracking event through a Dispatcher, such as a HeadTrackingDispatch 114, to and from the IPC 130, respectively.

In some embodiments, the Browser Process Module 110 supports processes executed on multiple Render Process Modules. Each Render Process can be executed in the corresponding Render Process Module that is separated from other Render Process Modules. To gain access to the Browser Process Module 110, each Render Process can communicate with the Browser Process Module 110 and impose security and access policies on the corresponding Render Process Module. Various embodiments establish a bi-direction data pipelines between the Browser Process Module 110 and each of multiple Render Process Modules. Each bi-direction data pipeline may include a filter to intercept IPC requests and/or selectively pass information from the Browser (Kernel) processes to the IPC 130.

In some embodiments, the Browser Process Module 110 may include a counter to track requests from one or more Web Applications 112. The Browser Process Module 110 or the Sensor Manager 124 is configured to stop detecting a particular event when the particular event is no longer requested by any of the one or more Web Applications 112 or the client device(s) rendering the one or more Web Applications 112 have been idle over a predetermined period of time.

Figure 2:
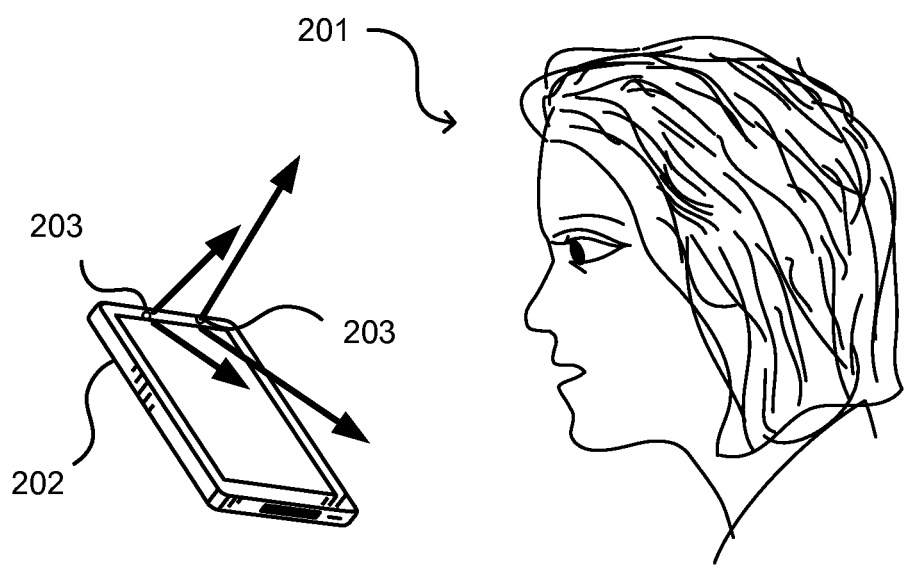
FIG. 2 illustrates examples of detecting and tracking head position of a user in accordance with various embodiments.

FIG. 2 illustrates examples of detecting and tracking head position of a user in accordance with various embodiments. In this example, a user 201 is viewing and/or interacting with a computing device 202. Although a portable computing device is shown in FIG. 2, it should be understood that various other types of electronic or computing device that capable of sensing images in accordance with various embodiments discussed herein. The computing device 202 may have one or more image capture elements 203, such as one or more cameras or camera sensors, to capture images and/or videos. The one or more image capture elements 203 may include a charge-coupled device (CCD), an active pixel sensor in complementary metal-oxide-semiconductor (CMOS) or N-type metal-oxide-semiconductor (NMOS), an infrared or ultrasonic image sensor, or an image sensor utilizing other type of image capturing technologies.

In this example, two or more front-facing image sensors 203, each of which is configured to capture 2D images, are located in different locations on the computing device 202. Different 2D images captured by the two or more image sensors 203 represent two or more perspectives of the same object, which can be used to determine the 3D head position (e.g., head position in x, y, and z axis) relative to the computing device 202. In some instances, two image sensors 203 facing the user 201 can be located on the computing device 202 in such a way that images captured by two image sensors 203 have a minor deviation equal or substantially equal to the perspectives that human eyes naturally receive in binocular vision. In some embodiments, 3D head position information can be inferred from one image sensor on the computing device 202, although the results may not be as accurate. In some instances, the image data from the one image sensor can be analyzed together with data from at least one other sensor on the computing device 202 to determine the 3D head position. For example, the distance between the user head and the computing device 202 can be determined by an ultrasonic sensor, a proximity sensor (e.g., a capacitive photoelectric sensor, an inductive sensor, an electromagnetic sensor, or the like), or an infrared sensor. In some embodiments, infrared images and the relative intensity of reflected infrared can be used to provide an Infrared head image and distance data, which can be combined with the image data from the one image sensor to calculate the relative head position in 3D.

In some embodiments, one or more non-intrusive light sources on the computing device 202 can be used to facilitate the head tracking process under different lighting conditions. For instances, infrared light (e.g., infrared laser light), with a speckle pattern, can be used to compute a depth map of the user head and infer relative head position in three dimensions.

In some embodiments, user profile on the portable computing device 202 can be analyzed to infer the distance between the user head and the computing device 202. For example, when a user utilizes a portable computing device, the head of the user is typically within a proximate range of distances (e.g., between 12 and 24 inches) depending on certain characteristics (e.g., eye sight) of the user and the font size on the display screen of the computing device 202. By analyzing the user's profile and the font size that the user is reading, the distance between the user head and the portable computing device 202 can be estimated according to some predetermined algorithms. In some embodiments, various types of information in the user profile can be used in estimating the distance, which may include user preference in reading content on a portable computing device, user age, body characteristics of the user (e.g., height, arm length, and eye sight), user gender, user educational background, user marital status, or user ethnicity. In some instances, the size of the display screen can also be used in estimating the distance between the head position and the display screen.

Some embodiments utilize object recognition or feature recognition algorithms to reduced process time and accuracy in a head tracking process. Certain features can be discarded or otherwise used as needed. In some instances, an outer shape or contour of a head position can be determined and used to calculate a relative head position. In some embodiments, the contour of a head position can be compared with a head and shoulders pattern to ensure the contour representing the user. In some instances, the range of shapes, ratios, and/or sizes of head, neck, shoulders, and hair length or style may be analyzed in tracking a relative head position.

In some embodiments, other types of genesis events (e.g., emotion tracking events, gaze tracking events, and eye tracking events) may be used in determine relative head position of a user. Objects (e.g., hat, glasses, stylus, jewelry) and materials (e.g., clothing) attached to the user head may be tracked in determining the relative head position and/or recognizing certain head gestures. In some embodiments, the user's facial features (e.g., eyes, nose, mouth, forehead, eyebrows, hair, or wrinkles) may be tracked in determining user's relative head position in 3D.

In some embodiments, background subtraction algorithms or filters can be applied to substrate or remove the background from a head tracking process. For example, background can be subtracted by using a frame differencing algorithm. Images taken in two difference times, t and t+1, can be compared to remove the background pixels. A higher threshold may be required when the scene moves at a fast speed. In some instances, a mean filter can be applied to subtract the background from an image. The background image at a time t can be calculated by averaging a series of preceding images. When the background changes over time (e.g., due to illumination changes or non-static background objects), a running Gaussian average algorithm can be used to calculate every pixel's mean and variance to accommodate the changing background. Various other image processing algorithms and/or filters (e.g., a linear filter, or an adaptive filter) may be used to smooth, sharpen, motion-blur, or edge-detect a relative head position in the head tracking process.

At least some embodiments determine paths of head motions in 3D by comparing the current head position in 3D to previously determined head positions in 3D, which can be used to provide for head gestures. For example, relative head position turns left and right along the transverse plane repeatedly in quick succession may indicate a user gesture for disagreement, denial or rejection. On the other hand, relative head position tilts in alternating up and down arcs along the sagittal plane may indicate a user gesture for agreement, acceptance or acknowledgment.

Figure 3A:
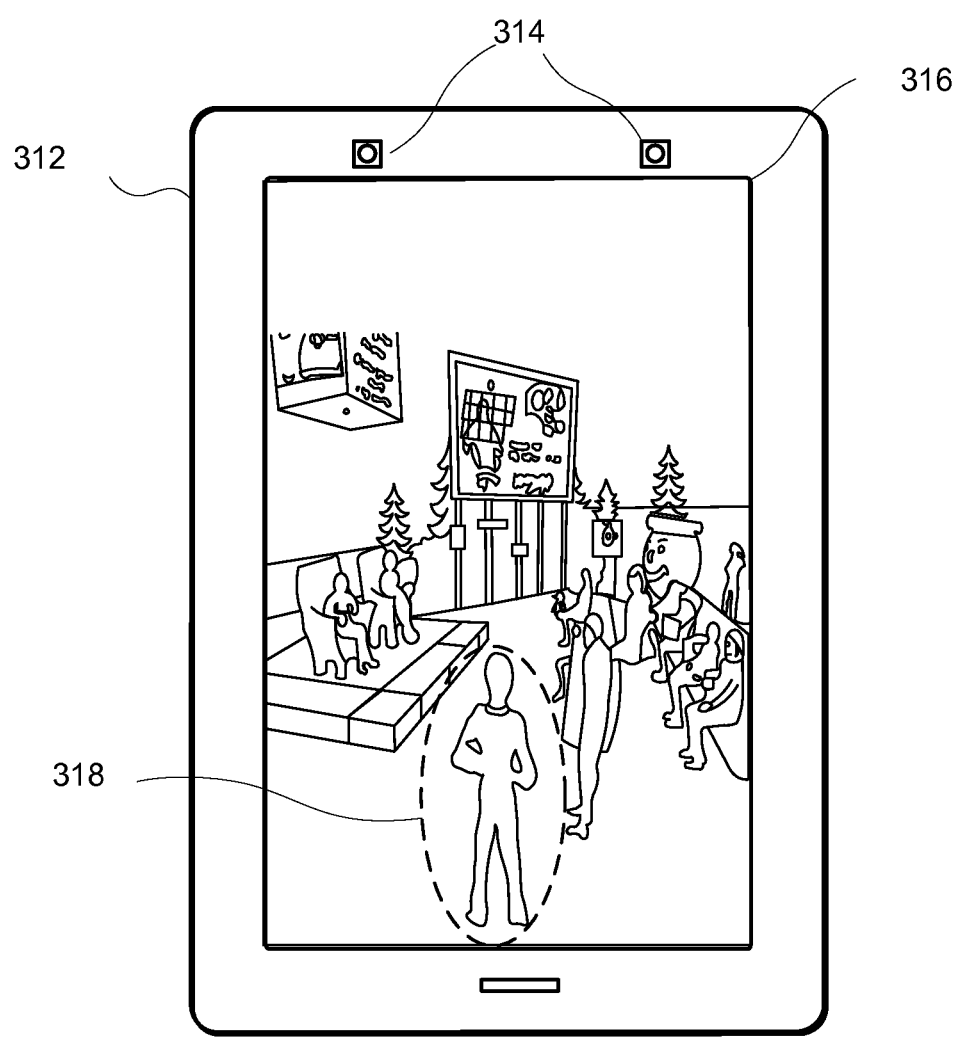
FIGS. 3A and 3B illustrate examples of determining content or object of interest based on a display screen portion at which the head position is directed in accordance with various embodiments.
Figure 3B:
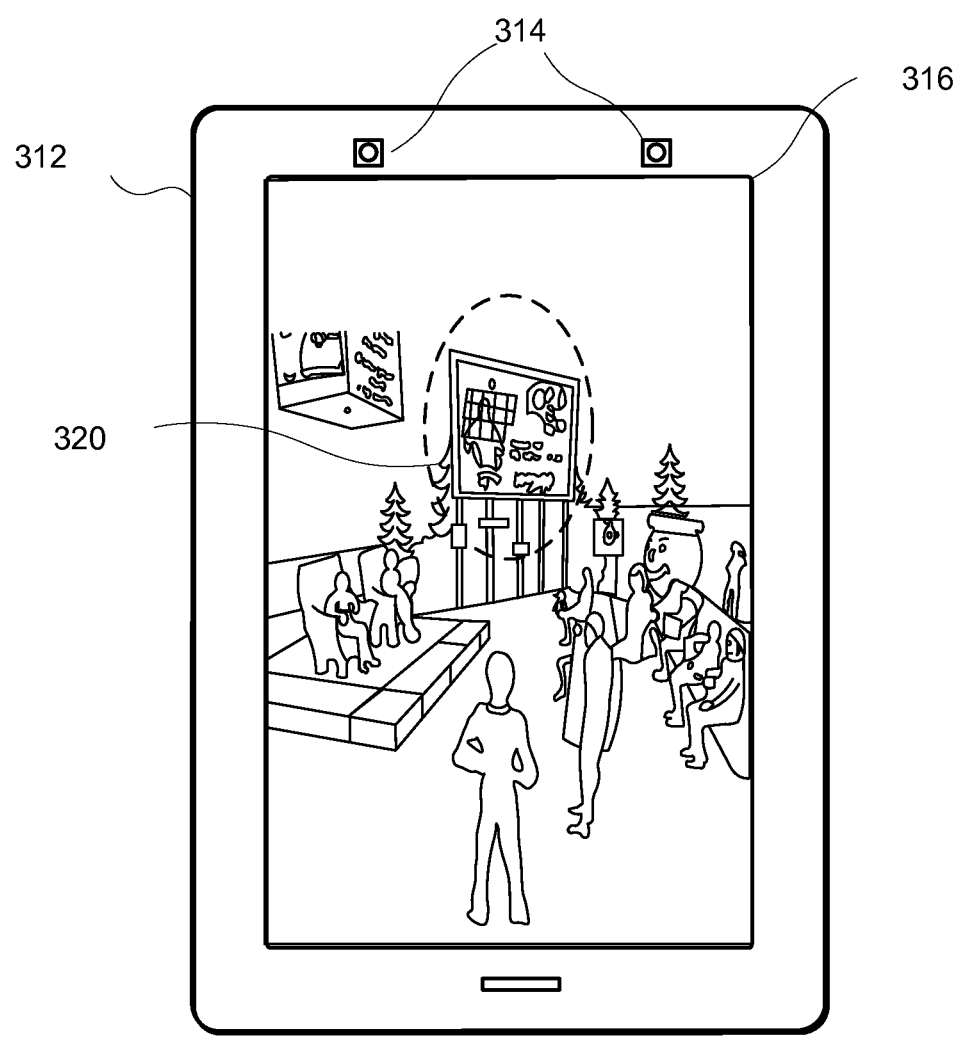

FIGS. 3A and 3B illustrate examples of determining content or object of interest based on a display screen portion at which the head position is directed in accordance with various embodiments. In these examples, the computing device 312 is configured to determine the 3D head position of a user by using two front-facing image sensors 314. In FIG. 3A, based at least in part upon the relative head position of the user, the computing device 312 can calculate and determine an area or an object 318 on the display screen 316 at which the head position is directed according to various triangulation and extrapolation algorithms. As the user moves his or her relative head position, the computing device 312 can dynamically calculate and determine a new area or a new object 320 at which the new head position is directed, which is illustrated in FIG. 3B. In some instances, content or object of interest on the display screen of the computing device may be determined based at least in part upon the relative head position and audio (e.g., spoken) commands.

Depending on the content corresponding to the areas that the head position of the user is directed, the computing device 312 may perform one or more actions related to the content or cause the content to be presented in various styles, such as zoom-in, zoom-out, animating, or rotating, etc. In some instances, additional information (e.g., advertisement) related to the content of interest may be presented on the computing device 312.

The computing device 312 may include an auto-focus (AF) system to adjust the optical system of the computing device 312 to ensure that the picture taken is sharp and independent of the distance of the object. In some embodiments, the computing device 312 may cause the optical system to measure distance to the object at which the relative head position of the user is directed at, and subsequently adjust the optical system for correct focus to the object of interest. The distance can be measured by one or more sensors on the computing device 312, including an ultrasonic sensor or an infrared sensor. For example, sound waves can be emitted from the computing device 312 and by measuring the delay in the reflection of the sound waves, distance to the object can be calculated. For another example, infrared light can be used to triangulate the distance to the object. In some embodiments, the computing device 312 may analyze the image on the display screen and cause the optical system to be adjusted with the correct focus for the object at which the relative head position of the user is directed at. In some instances, the computing device 312 may include one or more camera LEDs that can be used for focusing on the object of interest or providing some additional lighting in low light conditions.

Figure 4:
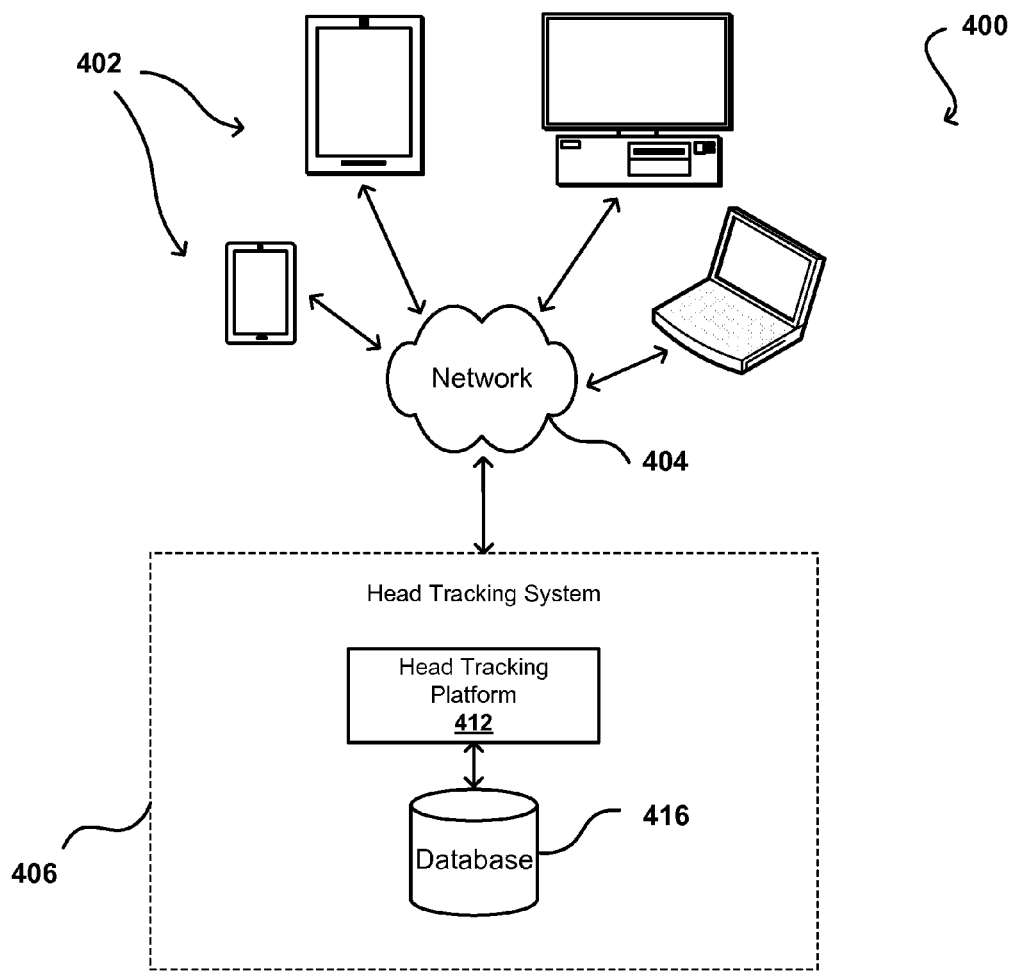
FIG. 4 illustrates an example of a head tracking system for providing head tracking applications in accordance with various embodiments.

FIG. 4 illustrates an example 400 of a head tracking system 406 for providing head tracking applications in accordance with various embodiments of the present disclosure. The head tracking system 406 communicates with the client computing devices 402 via the network 404. Although only some client computing devices 402 are shown in FIG. 4, it should be understood that various other types of electronic or computing device that capable of receiving, or rendering a Web application in accordance with various embodiments discussed herein. These client devices can include, for example desktop PCs, laptop computers, tablet computers, personal data assistants (PDAs), smart phones, portable media file players, e-book readers, portable computers, head-mounted displays, interactive kiosks, mobile phones, net books, single-board computers (SBCs), embedded computer systems, wearable computers (e.g., watches or glasses), gaming consoles, home-theater PCs (HTPCs), TVs, DVD players, digital cable boxes, digital video recorders (DVRs), computer systems capable of running a web-browser, or a combination of any two or more of these.

In some embodiments, the Head Tracking system 406 provides a Head Tracking Platform 412 for web developers and/or users to design Head Tracking Web applications with customized Head Tracking algorithms. In some embodiments, Head Tracking events collected on the client computing device 402 can be analyzed by a Head Tracking Web application on the client computing device 402, the Head Tracking system 406, or in the cloud according to one or more Head Tracking algorithms. In at least some embodiments, the Head Tracking system 406 stores some standard or most commonly used Head Tracking algorithms in a database 416. Stored Head Tracking algorithms can be called upon or incorporated in the Head Tracking Web applications.

Figure 5:
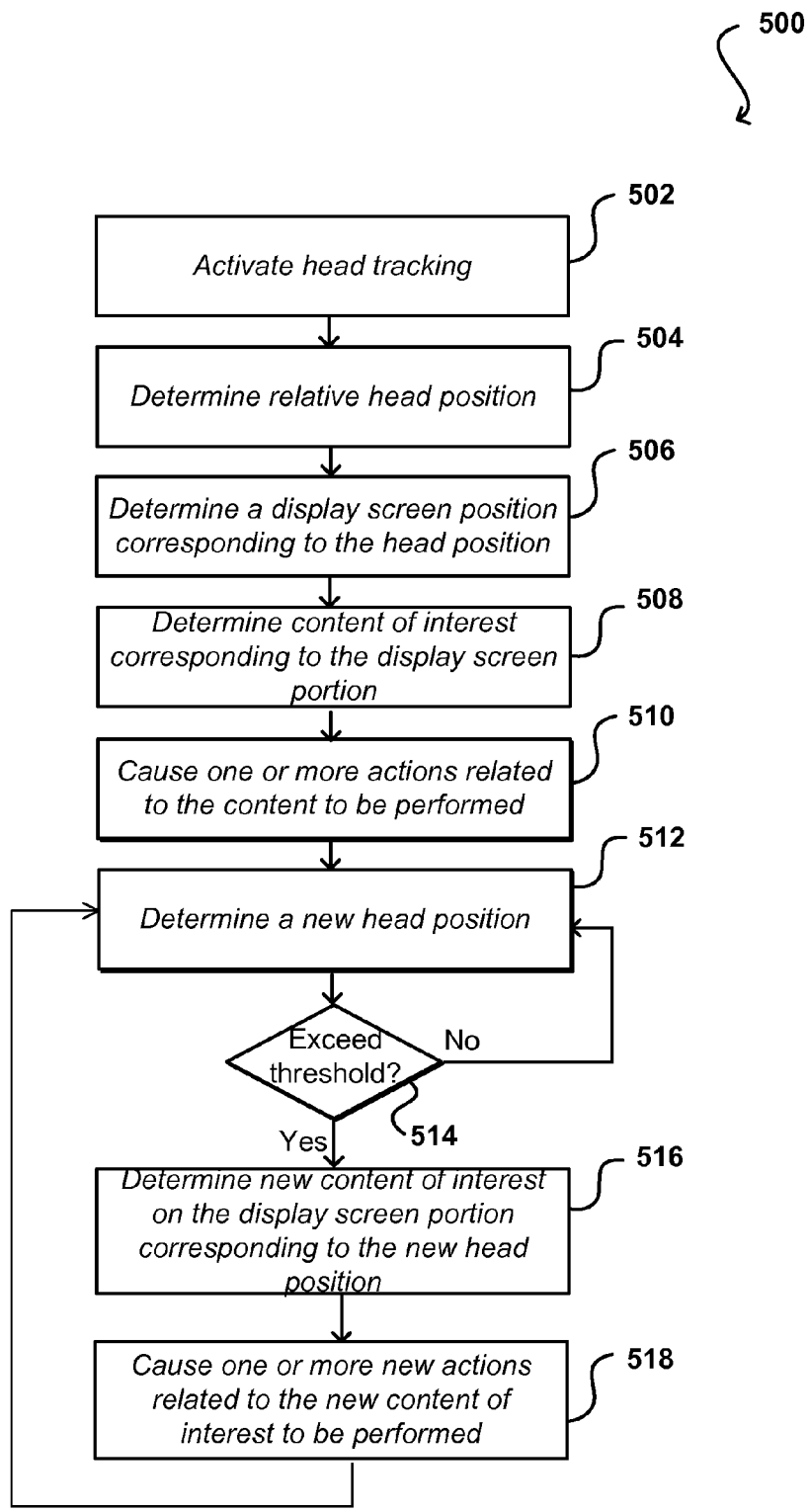
FIG. 5 illustrates an example process for tracking head movement to correlate the head position with content or object on a display screen that can be utilized in accordance with various embodiments.

FIG. 5 illustrates an example process for tracking head movement to correlate the head position with content or object on a display screen that can be utilized in accordance with various embodiments. It should be understood that there can be additional, fewer, or alternative steps performed in similar or alternative orders, or in parallel, within the scope of the various embodiments unless otherwise stated. The example method embodiment 500 starts with activating a Head Tracking system on a client computing device, at step 502. In some embodiments, the user of the client computing device has to manually active the Head Tracking system. In some instances, the Head Tracking system can be activated automatically when the client computing device detects the user or the client computing device is being used to capture an image or video. When the Head Tracking system is activated, sensors (e.g., an image sensor, an infrared sensor, a proximity sensor, and/or an ultrasonic sensor) on the client computing device can begin to collect Head Tracking events. The Head Tracking events can include stereoscopic head information in 3D (i.e., relative to x, y, and z axis) and a time stamp related to each Head Tracking event. Based at least upon the stereoscopic head information, the head position relative to the display of the client computing device can be determined, at step 504. The determination of the relative head position may also be based at least partially upon position and orientation information collected by other related sensors on the client computing device, such as a gyroscope, an inertial sensor, an accelerometer, an inclinometer, a magnetometer, and/or a compass.

The client computing device can analyze the relative head position in 3D and orientation and position of the display to determine a display screen position corresponding to the head position, at step 506. Based at least upon the display screen position, the client computing device can determine content or an object of interest corresponding to the display screen position, at step 508. Depending on the content or the object of interest, the client computing device may perform one or more actions related to the content or the object, at step 510. For example, based at least upon the content itself and the user's profile, the content can be zoomed in or out, rotated, animated or even blurred, and, in some instances, advertisements related to the content can be presented to the user. In the instance that the client computing device is used to capture an image or video, the object of interest on the display screen can be determined based at least upon the relative head position and then automatically focused.

As the user moves his or her head from one position to another, the client computing device can determine the new head position of the user, at step 512. The client computing device can dynamically compare the new position with the prior head position to determine whether the change is more than a predetermined threshold (e.g., a peak event), at step 514. If the change is less than the predetermined threshold, the client computing device will go back to step 512 and continue to check and determine the next head position of the user. If the change has met the predetermined threshold, the client computing device will determine new content of interest corresponding to the new head position, at step 516. Depending on the new content or the object of interest, the client computing device may perform one or more new actions related to the new content or the new object, at step 518. For example, when the client computing device is capturing an image or a video, an object of interest on the display screen that corresponds to direction of the head position of the user can be determined and automatically focused as the relative head position is moving from one place to another. In some embodiments, the computing device can dynamically determine content or object of interest as the head position of the user is moving from one place to another. In response to a new content or object is detected, the computing device can perform one or more new actions related to the new content or object.

Various other types of methods to tracking stereoscopic head position and determining content of interest based at least in part upon the relative head position are also possible, some of which are discussed in further detail elsewhere herein.

Figure 6:
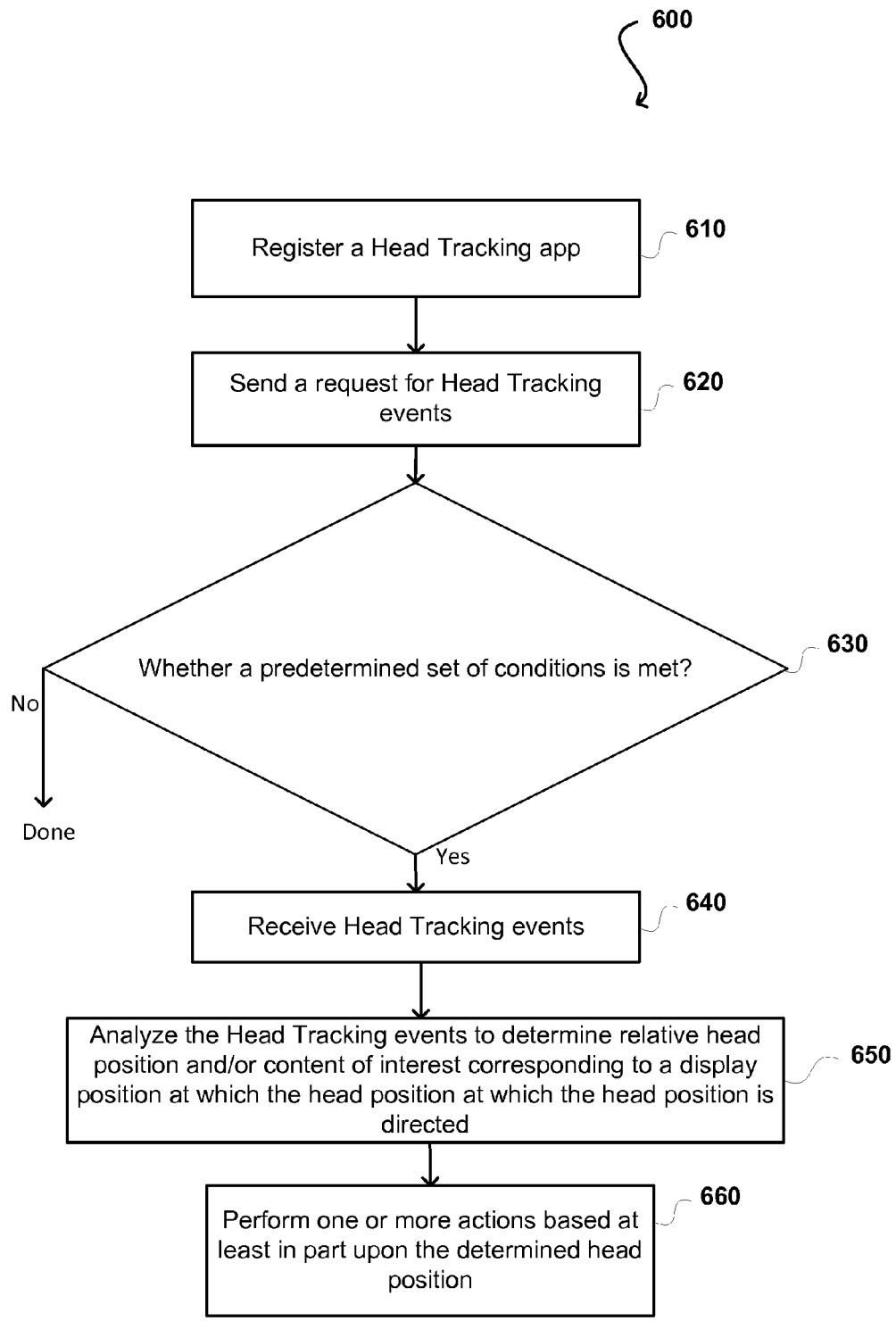
FIG. 6 illustrates an example process for requesting and analyzing head tracking events that can be utilized in accordance with various embodiments.

FIG. 6 illustrates an example process 600 for requesting and analyzing head tracking events that can be utilized in accordance with various embodiments. In this example, a Head Tracking application sends a request or message to a Sensor Manager and has the application registered with the Sensor Manager, at step 610. The Sensor Manager may be configured to collect a variety of sensor events that include, but are not limited to, head tracking events, eye tracking events, gaze tracking events, and emotion tracking events. In some embodiments, the head tracking application can be run in an operating system that is different from the operating system of the Sensor Manager. In many instances, the Sensor Manager has higher security privileges than the applications (e.g., head tracking applications).

The Head Tracking application sends a request for Head Tracking events from the Sensor Manager, at step 620. Upon receiving the request from the Head Tracking application, the Sensor Manager can make a determination whether a predetermined set of conditions are met, at step 630. The predetermined set of conditions may include, but are not limited to, whether the requested events are supported events, and whether the face of the user is detected etc. If the predetermined set of conditions is met, the Head Tracking application will start to receive Head Tracking events from the Sensor Manager, at step 640. In some embodiments, events from the Sensor Manager are intercepted by a Head Tracking Message filter, which is configured to selectively pass through the requested Head Tracking events from the Sensor Manager and intercept messages from the Head Tracking application. The Head Tracking application can dynamically analyze the received Head Tracking events to determine the relative head position of the user and/or content of interest corresponding to a display position at which the head position is directed, step 650. In some embodiments, other type of filters (e.g., an Eye Tracking filter, a Gaze Tracking filter, and/or an Emotion Tracking filter) may also be used to selectively pass related events, which may be helpful in determining the relative head position of the user and the corresponding content or object of interest on the display screen of the client computing device. Based at least in part upon the determined head position, one or more actions can be performed, at step 660.

Various embodiments provide a Platform for web developers and/or users to design Web applications (e.g., Head Tracking applications). Web developers may choose to customize application algorithms of the Web applications. In some embodiments, the Platform may also provide some standard or most commonly used algorithms for the web developers to select in the web applications. In some embodiments, processes of web applications and processes used to detect and collect sensor events can be run independently in different operating systems.

Figures 7A, 7B:
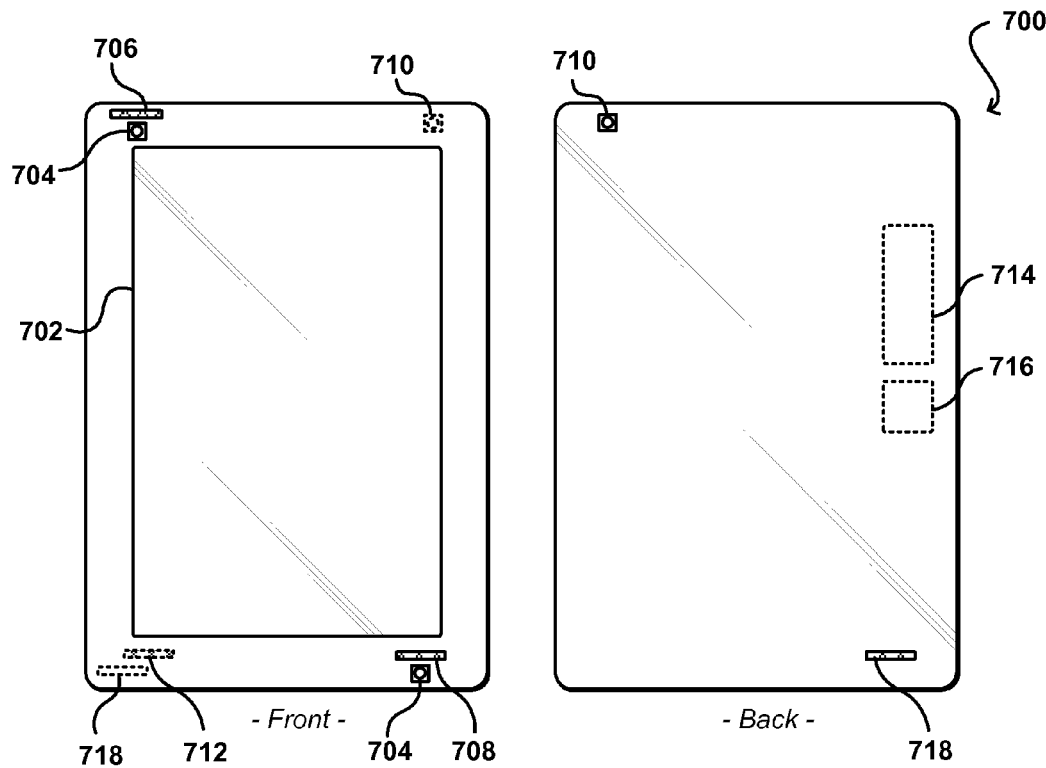
FIGS. 7A and 7B illustrate an example computing device that can be used to implement aspects of the various embodiments.

FIGS. 7A and 7B illustrate front and back views, respectively, of an example electronic computing device 700 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices are capable of receiving, displaying or playing streaming media files in accordance with various embodiments discussed herein. The devices can include, for example, desktop PCs, laptop computers, tablet computers, personal data assistants (PDAs), smart phones, portable media players, e-book readers, portable computers, head-mounted displays, interactive kiosks, mobile phones, net books, single-board computers (SBCs), embedded computer systems, wearable computers (e.g., watches or glasses), gaming consoles, home-theater PCs (HTPCs), TVs, DVD players, digital cable boxes, digital video recorders (DVRs), computer systems capable of running a web-browser, among others.

In this example, the computing device 700 has a display screen 702 (e.g., an LCD element) operable to display information or image content to one or more users or viewers of the device. The display screen of some embodiments displays information (e.g., streaming media file) to the viewer facing the display screen (e.g., on the same side of the computing device as the display screen). The computing device in this example can include one or more imaging elements, in this example including two image capture elements 704 on the front of the device and at least one image capture element 710 on the back of the device. It should be understood, however, that image capture elements could also, or alternatively, be placed on the sides or corners of the device, and that there can be any appropriate number of capture elements of similar or different types. Each image capture element 704 and 710 may be, for example, a camera, a charge-coupled device (CCD), a motion detection sensor or an infrared sensor, or other image capturing technology.

As discussed, the device can use the images (e.g., still or video) captured from the imaging elements 704 and 710 to generate a three-dimensional simulation of the surrounding environment (e.g., a virtual reality of the surrounding environment for display on the display element of the device). Further, the device can utilize outputs from at least one of the image capture elements 704 and 710 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 708 on the front side, one microphone 712 on the back, and one microphone 706 on or near a top or side of the device. In some devices there may be only one microphone, while in other devices there might be at least one microphone on each side and/or corner of the device, or in other appropriate locations.

The device 700 in this example also includes one or more orientation- or position-determining elements 718 operable to provide information such as a position, direction, motion, or orientation of the device. These elements can include, for example, accelerometers, inertial sensors, electronic gyroscopes, and electronic compasses.

The example device also includes at least one computing mechanism 714, such as may include at least one wired or wireless component operable to communicate with one or more electronic devices. The device also includes a power system 716, such as may include a battery operable to be recharged through al plug-in approaches, or through other approaches such as capacitive charging through proximity with a power mat or other such device. Various other elements and/or combinations are possible as well within the scope of various embodiments.

Figure 8:
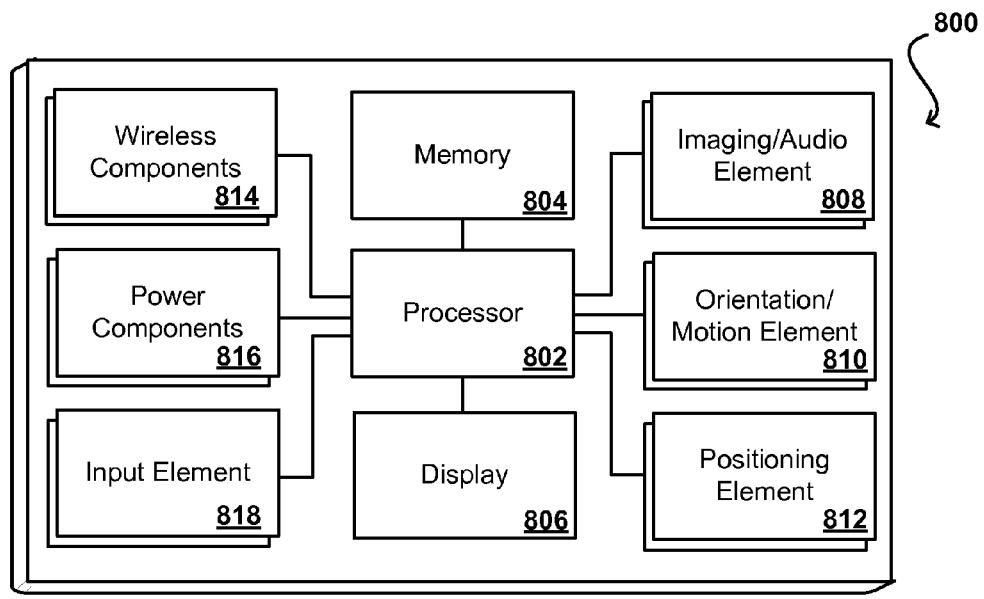
FIG. 8 illustrates example components of a computing device such as that illustrated in FIGS. 7A and 7B, in accordance with various embodiments.

FIG. 8 illustrates a set of basic components of an electronic computing device 800 such as the device 800 described with respect to FIGS. 7A and 7B. In this example, the device includes at least one processing unit 802 for executing instructions that can be stored in a memory device or element 804. As would be apparent to one of ordinary skill in the art, the device can include many types of memory, data storage, or computer-readable media, such as a first data storage for program instructions for execution by the processing unit(s) 802, the same or separate storage can be used for images or data, a removable memory can be available for sharing information with other devices, and any number of computing approaches can be available for sharing with other devices.

The device typically will include some type of display element 806, such as a touch screen, electronic ink (e-ink), organic light emitting diode (OLED) or liquid crystal display (LCD), although devices such as portable media players might convey information via other means, such as through audio speakers. The display element 806 is capable of displaying streaming media files or other information to viewers facing the display element 806.

As discussed, the device in many embodiments will include at least one imaging/audio element 808, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 800 also includes at least one orientation/motion determining element 810 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 800. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 812 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device. In some embodiments, the example computing device 800 may also include a low power, low resolution imaging element to capture image data. The low resolution imaging element can transmit the captured image data over a low bandwidth bus, such as an I2C bus, to a low power processor, such as a PIC-class processor. The PIC processor may also communicate with other components of the computing device 800, such as Orientation Motion Element 810, etc. The PIC processor can analyze the image data from the low resolution imaging element and other components of the computing device 800 to determine whether the head motion likely corresponds to a recognized head gesture. If the PIC processor determines that the head motion likely corresponds to a recognize head gesture, the PIC processor can enable other image element to activate high resolution image capture and/or main processor to analyze the capture high resolution image data.

The example device also includes one or more wireless components 814 operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more al wired communications connections as known in the art.

The device also includes a power system 816, such as may include a battery operable to be recharged through al plug-in approaches, or through other approaches such as capacitive charging through proximity with a power mat or other such device. Various other elements and/or combinations are possible as well within the scope of various embodiments.

In some embodiments the device can include at least one additional input device 818 able to receive al input from a user. This al input can include, for example, a push button, touch pad, touch screen, wheel, joystick, keyboard, mouse, keypad, or any other such device or element whereby a user can input a command or a request for additional product information to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

Figure 9:
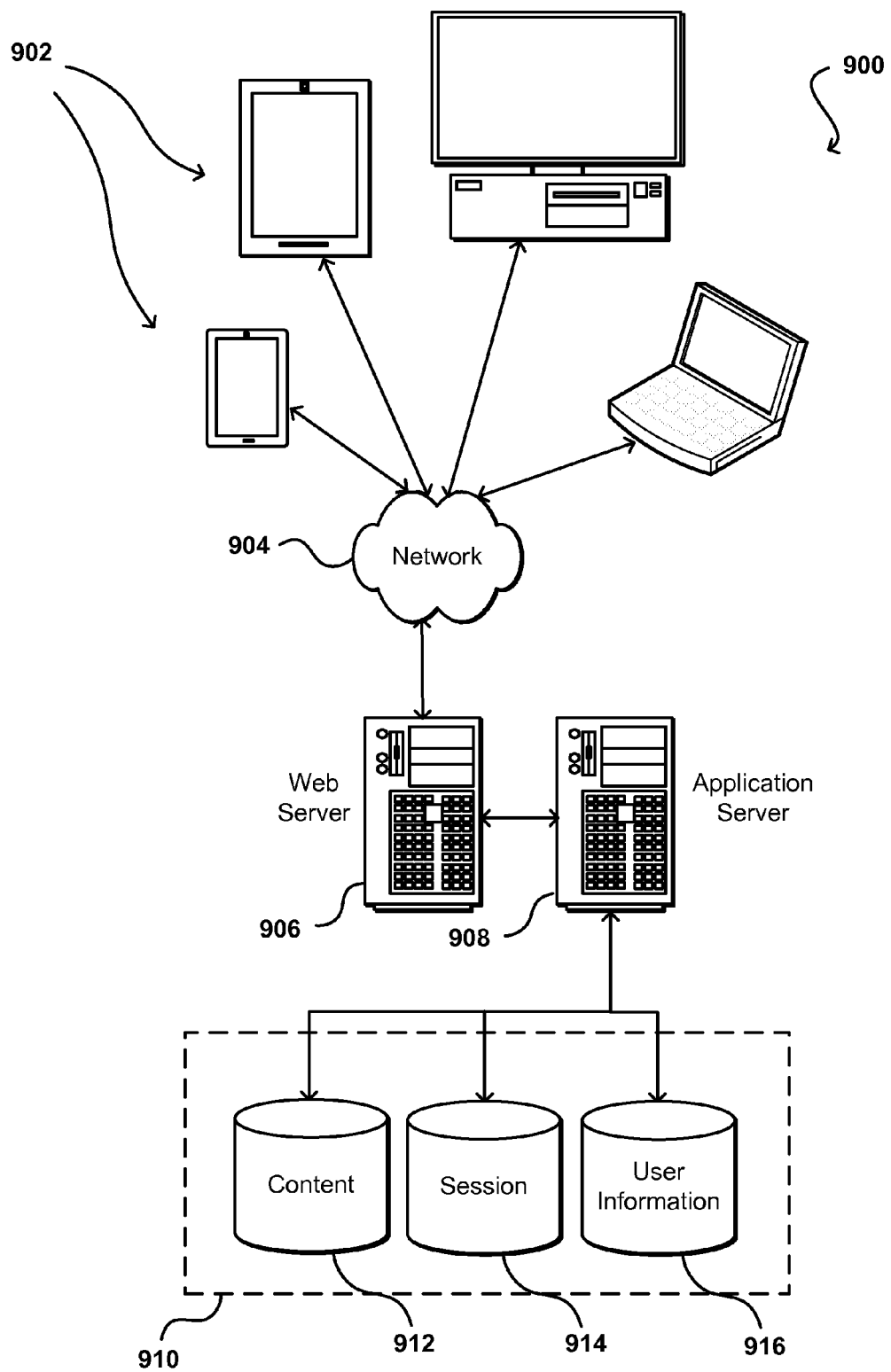
FIG. 9 illustrates an environment in which various embodiments can be implemented in accordance with various embodiments.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic computing device 902, which can include any appropriate device operable to send and receive requests, messages or information over an appropriate network 904 and convey information back to a user of the device. Examples of such computing devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the computing device. In a "pull" network, one or more of the servers send data to the computing device upon request for the data by the computing device. Components used for such a system can depend at least in part upon the type of network and/or environment selected. Protocols and components for communicating via such a network are well known and will not be discussed herein in detail. Computing over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the computing device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the computing device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The user information 916 may include user preference, historical data, user demographic data, and audio system of the user devices associated with users. Demographic data of users may include user age, user gender, user educational background, user marital status, user income level, user ethnicity, user postal code, user primary language, or user spending habit. The audio system may include headphone (e.g., earphone, ear bud, and the like), speaker (e.g., tablet speaker, blue tooth speaker, computer speaker, bookshelf speaker, center-channel speaker, floor speaker, in-wall and in-ceiling speaker, outdoor speaker, sound bar, portable speaker, and woofer/sub-woofer speaker), or various types of audio amplifiers. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via computing links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or computing devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared computing device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and computing media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
a camera;
a display;
at least one processor; and
memory including instructions that, when executed by the at least one processor, cause the system to:
capture a first image using the camera, the first image including a first representation of at least portion of a head of a user of the system;
determine a first head position based at least in part upon a location of the first representation in the first image;
determine a position on the display that corresponds to the first head position of the user according to one or more triangulation and extrapolation algorithms;
determine content being presented at the position on the display;
cause a first action related to the content to be performed, the first action including at least one of focusing to the content, rotating the content on the display, rendering a larger or smaller font of the content on the display, or rendering one or more advertisements related to the content on the display;
capture a second image using the camera, the second image including a second representation of at least portion of the head of the user of the system;
determine a second head position based at least in part upon a location of the second representation in the second image;
determine that the second head position is more than a threshold distance from the first head position; and
cause a second action related to the content to be performed, the second action being based at least in part upon a difference between the first head position and the second head position.

2. The system of claim 1, wherein the instructions when executed further cause the system to:
determine the first head position, the second head position, and the content being displayed at the position that corresponds to the first head position by a web application instantiated on the system, wherein the web application is an application software that runs in a web browser or in a browser-supported programming language.

3. The system of claim 1, wherein the instructions when executed further cause the system to:
automatically adjusting the orientation of the content on the display of the system based at least upon the first head position and the second head position.

4. The system of claim 1, wherein the instructions when executed further cause the system to:

determine duration that the user is directed to a second position on the display that corresponds to the second head position; and in response to the duration being longer than a threshold time value, determine content being presented at the second position on the display.

5. A computer-implemented method, comprising:
under the control of one or more computer systems configured with executable instructions,
causing one or more images to be captured by a computing device, the one or more images including a representation of at least portion of a head of a user;
determining a head position relative to a display of the computing device based at least in part upon a location of the representation in the one or more images;
determining a position on the display that corresponds to the head position of the user according to one or more triangulation and extrapolation algorithms;
determining content or an object being presented at the position on the display; and
causing one or more actions related to the content or the object to be performed on the computing device.

6. The computer-implemented method of claim 5, wherein the head position and the content or the object are determined by a web application instantiated on the computing device, wherein the web application is an application software that runs in a web browser or in a browser-supported programming language.

7. The computer-implemented method of claim 5, further comprising:
sending a request to a sensor module at least one head tracking event;
receiving the at least one head tracking event from the sensor module;
analyzing the at least one head tracking event to determine the head position and the content or the object corresponding to the position on the display at which the head of the user is directed.

8. The computer-implemented method of claim 7, wherein the at least one head tracking event is transmitted at a fixed rate or a rate specified by the web application to minimize a latency in transmitting the at least one head tracking event from the sensor module to the web application.

9. The computer-implemented method of claim 7, wherein the at least one head tracking event includes stereoscopic head information and a time stamp.

10. The computer-implemented method of claim 5, further comprising:
determining one or more inputs corresponding to the determined head position; and
enabling the user to control the content or the object being presented at the position on the display or the computing device based at least in part upon the determined one or more inputs.

11. The computer-implemented method of claim 5, further comprising:
causing second one or more images to be captured by the computing device, the second one or more images including a second representation of at least portion of the head of the user;
determining a second head position based at least in part upon a location of the second representation in the second one or more images; wherein the head position includes 3D head information at a first time and the second head position includes 3D head information at a second time;
determining a head gesture by comparing the second head position, the head position, and/or one or more prior head positions; and
enabling the user to maneuver the content or the object on the display based at least in part upon the head gesture.

12. The computer-implemented method of claim 5, further comprising:
in response to detecting that the direction of the head of the user turns away from the computing device or the head of the user is not detected over a pre-determined period of time, causing the content being played on the computing device to be paused.

13. The computer-implemented method of claim 5, wherein the head position is calculated at least in part upon position and orientation information collected by one or more sensors on the computing device, the one or more sensors including at least one of a gyroscope, an inertial sensor, an accelerometer, an inclinometer, a magnetometer, or a compass.

14. The computer-implemented method of claim 5, further comprising:
causing second one or more images to be captured by the computing device, the second one or more images including a second representation of at least portion of the head of the user;
determining a second head position based at least in part upon a location of the second representation in the second one or more images; and
in response to the second head position being detected, dynamically determining second content or a second object being presented at a second position on the display that corresponds to the second head position according to the one or more triangulation and extrapolation algorithms.

15. The computer-implemented method of claim 14, further comprising:
causing a camera system on the computing device to measure distance between the second object and the computing device by using at least one of ultrasonic waves or infrared light; and
causing the camera system to subsequently adjust for correct focus to the second object.

16. The computer-implemented method of claim 14, further comprising:
analyzing the second one or more images captured by the computing device; and
causing the camera system to subsequently adjust for correct focus to the second object.

17. A non-transitory computer-readable storage medium including instructions that, when executed by at least one processor of a computing system, cause the computing system to:
cause one or more images to be captured by a computing device, the one or more images including a representation of at least portion of a head of a user;
determine a head position relative to a display of the computing device based at least in part upon a location of the representation in the one or more images;
determine a position on the display that corresponds to the head position of the user according to one or more triangulation and extrapolation algorithms;
determine content or an object being presented at the position on the display; and cause one or more actions related to the content or the object to be performed.

18. The non-transitory computer-readable storage medium of claim 17, wherein the instructions when executed further cause the system to:
    compute a depth map of the user's head by using a non-intrusive light source on the computing device; and
    determine the head position in three dimensions based at least in part upon the depth map or the at least the portion of the head of the user in the one or more images.

19. The computer-implemented method of claim 17, further comprising:
    determine the head position and the content or the object by using a web application instantiated on the computing device, wherein the web application is an application software that runs in a web browser or in a browser-supported programming language.

20. The computer-implemented method of claim 17, further comprising:
    send a request to a sensor module for at least one head tracking event;
    receive the at least one head tracking event from the sensor module;
    analyze the at least one head tracking event to determine the head position and the content or the object corresponding to the position on the display at which the head of the user is directed.

21. The non-transitory computer-readable storage medium of claim 17, wherein the instructions when executed further cause the system to:
    determine a range of distance between the user's head and the display of the computing device by analyzing at least one of a plurality of user's characteristics, the size of the display, or the font of content or objects being presented on the display; the plurality of user's characteristics including at least one of eye sight, height, or arm length.

22. The non-transitory computer-readable storage medium of claim 21, wherein the instructions when executed further cause the system to:
    remove the background from the one or more images by using one or more background subtraction algorithms; the one or more background subtraction algorithms including at least one of a frame differencing algorithm, a mean algorithm, or a running Gaussian average algorithm; and
    enhance the image quality of the portion of the head of the user in the one or more images by using one or more image processing filters, the one or more image processing filters including at least one of a linear filter or an adaptive filter.

* * * * *